United States Patent
Nibecker, Jr.

(10) Patent No.: US 9,719,752 B1
(45) Date of Patent: Aug. 1, 2017

(54) SPEARS AND SPEAR GUNS INCORPORATING THE SAME

(71) Applicant: Alfred F. Nibecker, Jr., Honoka'a, HI (US)

(72) Inventor: Alfred F. Nibecker, Jr., Honoka'a, HI (US)

(73) Assignee: Alfred F. Nibecker, Jr., Honoka'a, HI (US)

( * ) Notice: Subject to any disclaimer, the term of this patent is extended or adjusted under 35 U.S.C. 154(b) by 0 days.

(21) Appl. No.: 15/224,344

(22) Filed: Jul. 29, 2016

(51) Int. Cl.
  *F41B 11/83* (2013.01)
  *F41B 11/62* (2013.01)
  *F42B 6/02* (2006.01)

(52) U.S. Cl.
  CPC .............. *F41B 11/83* (2013.01); *F41B 11/62* (2013.01); *F42B 6/02* (2013.01)

(58) Field of Classification Search
  CPC  F41B 11/60; F41B 11/62; F41B 11/72; F41B 11/723; F41B 11/83; F42B 6/00; F42B 6/02; F42B 6/08; F42B 10/18; F42B 10/20; F42B 12/68; F42B 30/14
  USPC ........................ 102/69, 73, 70, 57
  See application file for complete search history.

(56) References Cited

U.S. PATENT DOCUMENTS

| | | | | | |
|---|---|---|---|---|---|
| 385,416 | A | * | 7/1888 | Luscomb et al. | F42B 30/14 102/371 |
| 1,818,810 | A | * | 8/1931 | Miller | F41A 9/23 124/51.1 |
| 2,660,993 | A | * | 12/1953 | Blakeslee | F41B 11/83 124/71 |
| 2,756,737 | A | * | 7/1956 | Resch, Jr. | A47G 33/06 124/62 |
| 2,839,862 | A | * | 6/1958 | Hanshaw | F41B 11/83 124/27 |
| 3,045,659 | A | * | 7/1962 | Malcolm | F41B 11/83 124/57 |
| 3,071,883 | A | * | 1/1963 | Merz | F41B 11/83 124/61 |
| 3,313,208 | A | * | 4/1967 | Dorsey, Jr. | F41A 1/04 102/431 |
| 3,452,466 | A | * | 7/1969 | Heartness | A01K 81/00 43/6 |
| 3,586,332 | A | * | 6/1971 | Alban | B64D 17/34 43/6 |
| 3,780,720 | A | * | 12/1973 | Alderson | A01K 81/00 124/31 |
| 4,019,480 | A | * | 4/1977 | Kenaio | F41B 11/83 124/31 |
| 4,110,929 | A | * | 9/1978 | Weigand | A01K 91/02 124/57 |

(Continued)

*Primary Examiner* — Derrick Morgan

(57) ABSTRACT

A spear for use with a spear gun includes a hollow shaft having a leading end and a trailing end opposite the leading end, a piston retained in the hollow shaft and configured to slide within the hollow shaft, and a check valve. The piston forms a seal with an inner surface of the hollow shaft and divides the hollow shaft into a pre-charge chamber toward the leading end and a firing charge chamber toward the trailing end. The check valve is in fluid communication with the pre-charge chamber and is configured to permit a pressurized gas pre-charge to enter the pre-charge chamber and restrict the gas pre-charge in the pre-charge chamber from exiting the pre-charge chamber.

19 Claims, 8 Drawing Sheets

(56) References Cited

U.S. PATENT DOCUMENTS

| | | | | |
|---|---|---|---|---|
| 4,531,458 | A * | 7/1985 | Saxby | F41B 11/62 |
| | | | | 102/430 |
| 5,706,795 | A * | 1/1998 | Gerwig | F41H 13/0006 |
| | | | | 124/71 |
| 6,170,477 | B1 * | 1/2001 | Horlock | F41B 11/83 |
| | | | | 124/61 |
| 7,146,973 | B2 * | 12/2006 | Seekman | F41A 21/482 |
| | | | | 124/71 |
| 7,412,975 | B2 * | 8/2008 | Dillon, Jr. | F41B 11/62 |
| | | | | 102/440 |
| 8,256,406 | B1 * | 9/2012 | Kirkpatrick | F41B 11/723 |
| | | | | 102/440 |
| 9,434,458 | B2 * | 9/2016 | Macri | B63C 9/22 |
| 2009/0084371 | A1 * | 4/2009 | Nibecker, Jr. | F41B 11/724 |
| | | | | 124/69 |
| 2009/0159065 | A1 * | 6/2009 | Moffitt | A01K 81/00 |
| | | | | 124/71 |
| 2014/0251296 | A1 * | 9/2014 | Flint | F41B 11/73 |
| | | | | 124/57 |

* cited by examiner

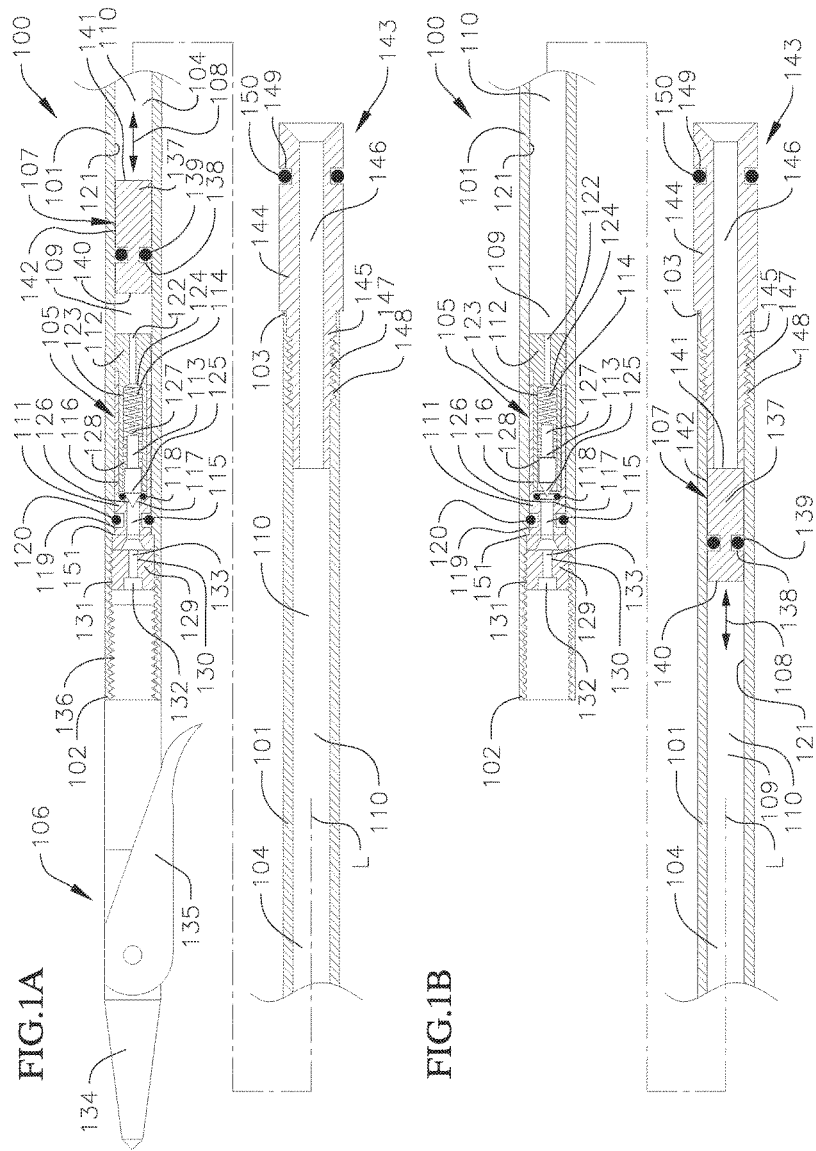

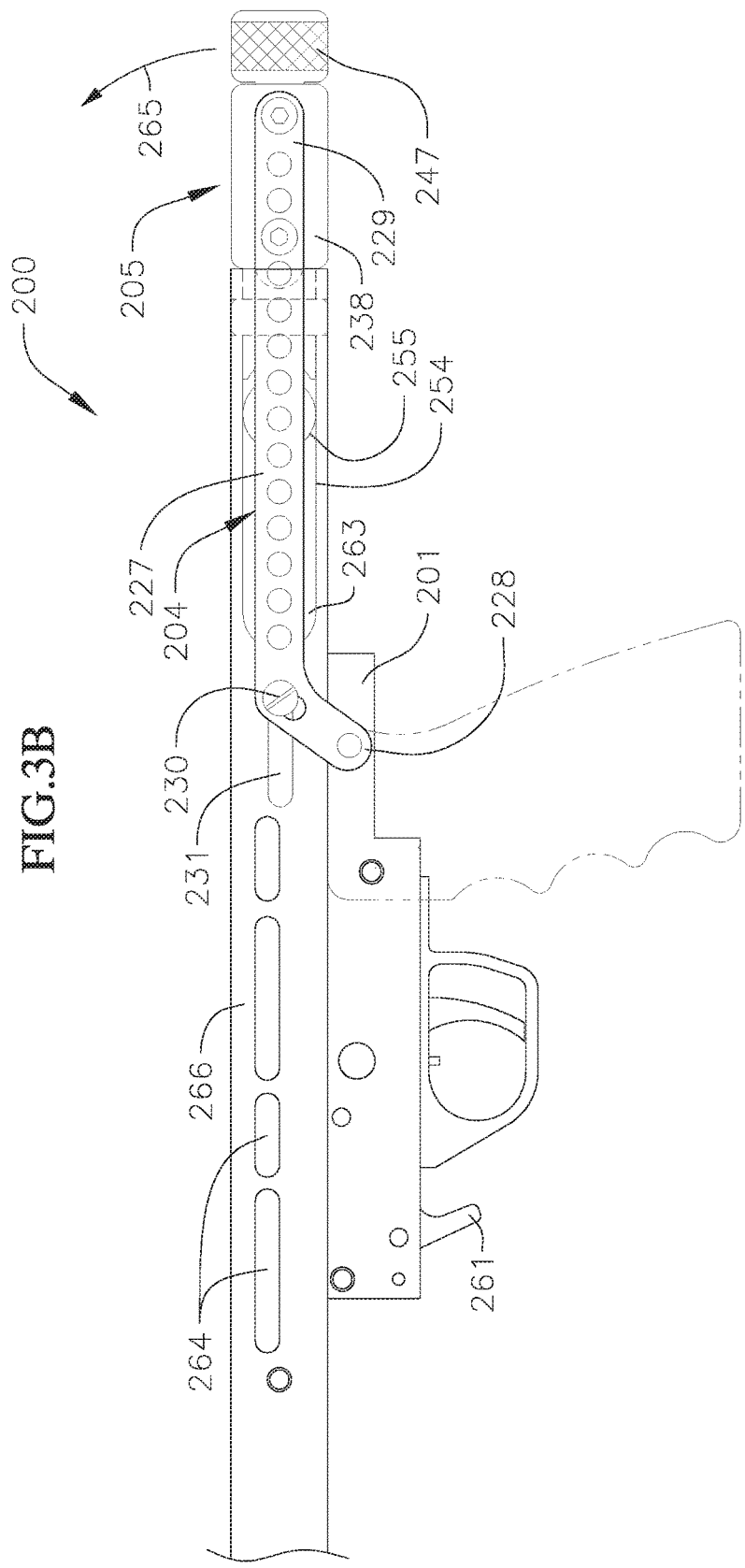

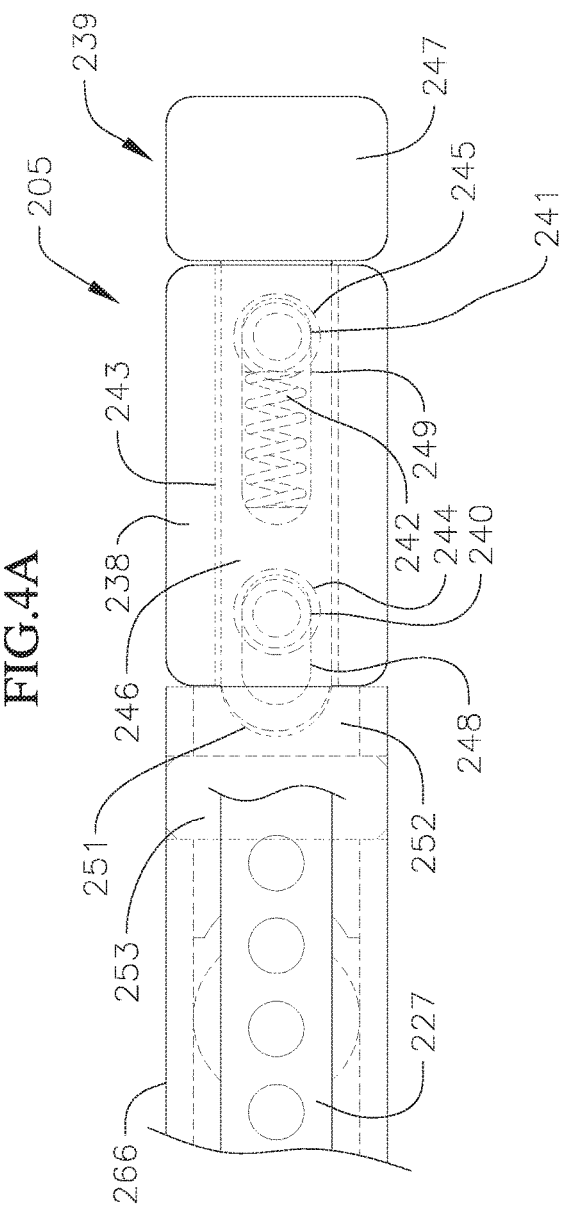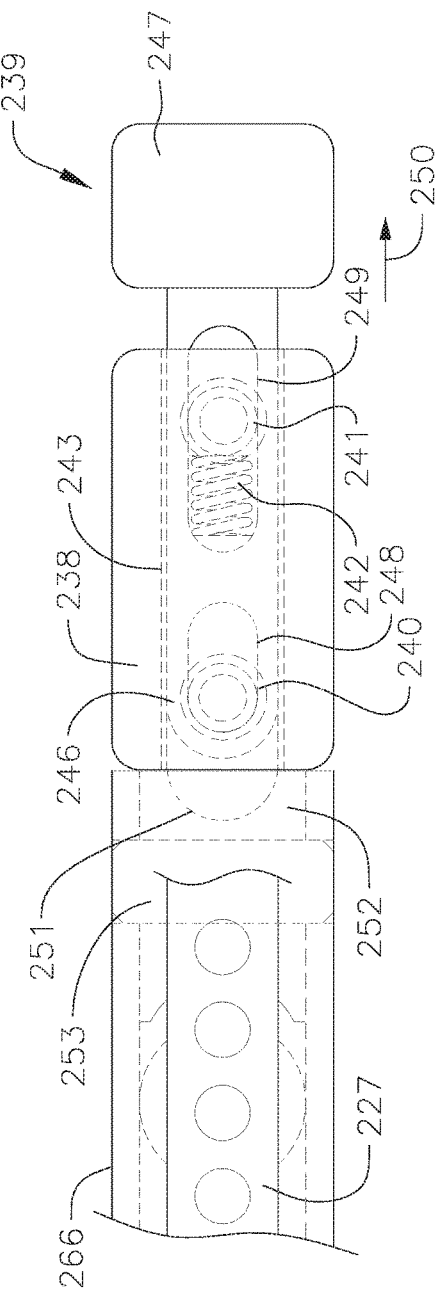

SPEARS AND SPEAR GUNS INCORPORATING THE SAME

FIELD

The present disclosure relates generally to spears and spear guns.

BACKGROUND

Spear guns are commonly used to hunt fish or other underwater animals. Spear guns typically include a spear, a barrel, and a firing mechanism for firing the spear from the barrel. Several different types of spear guns exist, including gas-powered spear guns and band-powered spear guns. In conventional band-powered spear guns, the spear is supported on the barrel and is fired by one or more elastic bands stretched between a slot in the front end of the barrel and the rear end of the spear. The power of the band-powered spear gun may be adjusted by adding or removing one or more elastic bands. In conventional gas-powered spear guns, the spear is launched from the barrel of the spear gun with a high velocity that causes cavitation of the water immediately behind the spear (i.e., in the wake of the traveling spear). The cavitation of the water creates a relatively low pressure area behind the spear that impedes or retards the travel of the spear through the water and thereby limits the power, range, and efficacy of the spear.

Some conventional spears address the problem of cavitation by pressurizing a hollow spear with a high-pressure charge (e.g., 1000 psig) prior to firing the spear. The pressurized spear is typically retained in the barrel of the spear gun with a trigger sear that must be disengaged to fire the spear. However, pre-pressurizing the spear with the firing charge prevents the user from unloading the spear from the barrel of the spear gun without having to fire the spear or otherwise wasting the high-pressure charge. This is both wasteful and inconvenient if a user wishes unload the spear but has not found a suitable target in the water. Additionally, the high-pressure charge may leak over time and therefore may supply an insufficient charge to adequately launch the spear once the user is ready to fire the spear.

SUMMARY

The present disclosure is directed to various embodiments of a spear for use with a spear gun. In one embodiment, the spear includes a hollow shaft having a leading end and a trailing end opposite the leading end, a piston retained in the hollow shaft and configured to slide within the hollow shaft, and a check valve. The piston forms a seal with an inner surface of the hollow shaft and divides the hollow shaft into a pre-charge chamber toward the leading end and a firing charge chamber toward the trailing end. The check valve is in fluid communication with the pre-charge chamber and is configured to permit a pressurized gas pre-charge to enter the pre-charge chamber and restrict the gas pre-charge in the pre-charge chamber from exiting the pre-charge chamber. The spear may include a spear head configured to be coupled to the leading end of the hollow shaft. The spear may be adapted to permit the gas pre-charge to be introduced into the pre-charge chamber through the check valve. The gas pre-charge slides the piston within the hollow shaft toward the trailing end and results in the pre-charge chamber being pressurized to a pre-charge pressure. The spear may be adapted to be propelled from the spear gun by introducing a pressurized gas firing charge at a pressure higher than the pre-charge pressure into the firing charge chamber through the trailing end of the hollow shaft. The introduction of the pressurized gas firing charge fills the firing charge chamber with gas firing charge, expands the firing charge chamber by sliding the piston within the hollow shaft toward the leading end of the hollow shaft, and compresses the gas pre-charge within the pre-charge chamber to a pressure higher than the pre-charge pressure. The spear may also include an end fitting coupled to the trailing end of the hollow shaft configured to retain the piston within the hollow shaft. The hollow shaft may be formed of steel or carbon fiber and the piston may be formed of plastic. The piston may include an O-ring engaging the inner surface of the hollow shaft to form the seal.

The present disclosure is directed to various embodiments of a spear gun system. In one embodiment, the spear gun system includes a spear gun including a trigger block, a housing coupled to the trigger block that is configured to receive a gas cartridge, a barrel extending from the housing, and a firing mechanism coupled to the trigger block and the housing. The spear gun system also includes a spear configured to be inserted into the barrel of the spear gun. The spear includes a hollow shaft having a leading end and a trailing end opposite the leading end, a piston retained in the hollow shaft and configured to slide within the hollow shaft, a check valve, and a spear head configured to be coupled to the leading end of the hollow shaft. The piston forms a seal with an inner surface of the hollow shaft and divides the hollow shaft into a pre-charge chamber toward the leading end and a firing charge chamber toward the trailing end. The check valve is in fluid communication with the pre-charge chamber and is configured to permit a pressurized gas pre-charge to enter the pre-charge chamber and restrict the gas pre-charge in the pre-charge chamber from exiting the pre-charge chamber. The spear may be adapted to permit the gas pre-charge to be introduced into the pre-charge chamber through the check valve. The gas pre-charge slides the piston within the hollow shaft toward the trailing end and results in the pre-charge chamber being pressurized to a pre-charge pressure. When the spear is attached to the spear gun and the firing mechanism is actuated to fire the spear from the spear gun, a firing charge having a pressure higher than the pre-charge pressure may be released from the gas cartridge into the firing charge chamber through the trailing end of the hollow shaft. The firing charge forces the piston to slide within the chamber of the hollow shaft toward the leading end of the hollow shaft and compresses the gas pre-charge within the pre-charge chamber to a pressure higher than the pre-charge pressure. The pre-charge pressure of the gas pre-charge may be from approximately 3 psig to approximately 100 psig and the pressure of the firing charge may initially be from approximately 800 psig to approximately 1200 psig.

The firing mechanism may include a spring-loaded hammer and a pin. The spring-loaded hammer is configured to drive the pin into the gas-cartridge to puncture the gas-cartridge when the firing mechanism is actuated. The firing mechanism may also include a trigger and a sear. When the trigger is pulled, the sear is configured to disengage spring-loaded hammer. The spear gun system may also include a cocking mechanism for cocking the spear gun. The cocking mechanism may include a cocking sleeve in the housing of the spear gun and at least one cocking arm engaging the cocking sleeve. The spear gun system may also include a lock and release mechanism coupled to the cocking mechanism for selectively locking and unlocking the cocking mechanism to the housing of the spear gun.

The present disclosure is also directed to various embodiments of a method of firing a spear from a spear gun. The spear includes a hollow shaft having a leading end and a trailing end opposite the leading end, a piston retained in the hollow shaft and configured to slide within the hollow shaft, the piston forming a seal with an inner surface of the hollow shaft and dividing the hollow shaft into a pre-charge chamber toward the leading end and a firing charge chamber toward the trailing end, a check valve in fluid communication with the pre-charge chamber and configured to permit a pressurized gas pre-charge to enter the pre-charge chamber and restrict the gas pre-charge in the pre-charge chamber from exiting the pre-charge chamber, and a spear head configured to be coupled to the leading end of the hollow shaft. The method includes pumping a gas pre-charge into the pre-charge chamber of the hollow shaft through the check valve, attaching the spear head to the leading end of the hollow shaft, loading the spear into a barrel of the spear gun, and firing the spear from the spear gun. The gas pre-charge forces the piston to slide toward the trailing end of the hollow shaft. The firing releases a firing charge into the firing charge chamber through the trailing end of the hollow shaft. The firing charge forces the piston to slide within the hollow shaft toward the leading end of the hollow shaft and compress the gas pre-charge in the pre-charge chamber.

The method may also include cocking the spear gun and loading a gas cartridge into the spear gun. Firing the spear may include actuating a firing mechanism to release the firing charge from the gas cartridge. The firing charge has a greater pressure than the gas pre-charge. The pressure of the gas pre-charge may be from approximately 3 psig to approximately 100 psig and the pressure of the firing charge may be from approximately 800 psig to approximately 1200 psig. The method may also include adjusting a range of the spear by replacing the pre-charge with a second pre-charge having a different pressure.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1A-1B are cross-sectional views of a spear according to one embodiments of the present disclosure in a first configuration and a second configuration, respectively;

FIGS. 3A-3B are side views of a cocking mechanism in a first configuration and a second configuration, respectively, according to one embodiment of the present disclosure;

FIGS. 4A-4B are detail views of a lock and release assembly in a locked configuration and an unlocked configuration, respectively, according to one embodiment of the present disclosure;

DETAILED DESCRIPTION

Figure 2A:
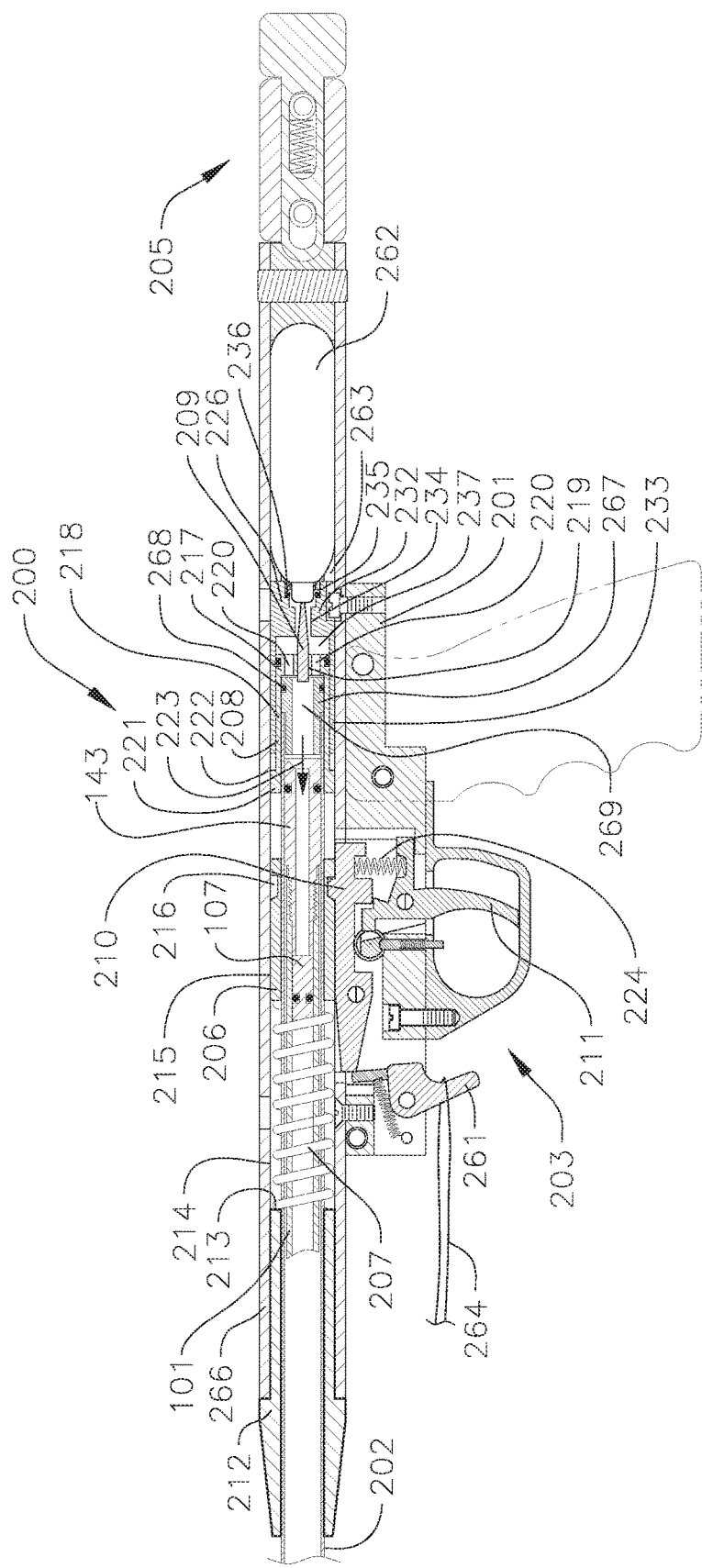
FIGS. 2A-2B are cross-sectional views of a spear gun according to one embodiment of the present disclosure in a first configuration and a second configuration, respectively, configured to fire the embodiment of the spear illustrated in FIGS. 1A-1B.

The present disclosure is directed to various embodiments of a spear and a spear gun. The spear according to one or more embodiments includes a hollow shaft and a piston configured to reciprocate within the hollow shaft. The hollow shaft is adapted to be pressurized by a gas pre-charge that causes the piston to slide rearward within the hollow shaft, which prevents water from entering the hollow shaft. A rear end of the hollow shaft is adapted to receive a high-pressure firing charge that causes the piston to slide forward within the hollow shaft and compress the gas pre-charge. The high-pressure firing charge is configured to discharge from the hollow shaft to reduce or mitigate the negative effects of cavitation of water behind the spear after the spear is fired from a spear gun underwater (e.g., the negative pressure differential due to cavitation behind the spear may be replaced by the positive pressure of the high-pressure firing charge in the hollow shaft). This increases the range, power, and overall efficacy of the spear compared to conventional spears. The gas pre-charge retained in the spear is configured to return the piston to the rearward position as the firing charge is discharged from the hollow shaft. Additionally, a spear gun according to one or more embodiments of the present disclosure includes a firing mechanism that enables the spear shaft to be charged with the high-pressure firing charge at the time of firing. Accordingly, the gas cartridge and/or the spear may be safely unloaded from the spear gun at any time prior to firing. Pressurizing the spear at the time of firing is also configured to prevent leakage of the firing charge over time.

With reference now to FIGS. 1A-1B, a spear 100 according to one embodiment of the present disclosure includes a hollow shaft or tube 101 having a leading end 102 and a trailing end 103 opposite to the leading end 102. The hollow shaft 101 defines a shaft chamber 104 extending along a longitudinal axis L of the shaft 101 from the leading end 102 to the trailing end 103 of the shaft 101. In the illustrated embodiment, the spear 100 also includes a check valve 105 (i.e., a one-way valve) in the chamber 104 and coupled to, and in fluid communication with, the shaft 101 proximate to the leading end 102, a spear head 106 configured to be coupled to the leading end 102 of the shaft 101, and a spear piston 107 retained in the chamber 104 of the shaft 101. The spear piston 107 is configured to slide (arrow 108) within chamber 104 between a forward-most position (shown FIG. 1A) proximate to the leading end 102 of the shaft 101 and a rearward-most position (shown in FIG. 1B) proximate to the trailing end 103 of the shaft 101 (i.e., the spear piston 107 is configured to reciprocate within the chamber 104 of the shaft 101). The spear piston 107 divides the chamber 104 between a forward pre-charge chamber 109 and a rear firing charge chamber 110. The pre-charge chamber 109 is the portion of the chamber 104 between the leading end 102 of the shaft 101 and the spear piston 107 and the firing charge chamber 110 is the portion of the chamber 104 between the trailing end 103 of the shaft 101 and the spear piston 107.

In one or more embodiments, the shaft 101 of the spear 100 may be made out of any suitable material, for example, a metal such as steel and/or aluminum, an alloy, a plastic composite such as carbon fiber, or combinations thereof. The shaft 101 may have any suitable size, such as, for instance, an outer diameter from approximately ¼ in to approximately ⅜ in and a length from approximately 30 in to approximately 42 in.

The check valve 105 is configured to permit gas (e.g., air) to enter the pre-charge chamber 109 through the check valve 105 and prevent gas in the pre-charge chamber 109 from escaping through the check valve 105. In the illustrated embodiment, the check valve 105 includes a check valve body 111, a rear cap 112 engaging the check valve body 111, and a valve poppet 113 and a spring 114 retained in the check valve body 111 and the rear cap 112.

In the illustrated embodiment, the check valve body 111 is of a generally cylindrical shape. In the illustrated embodiment, an outer diameter of a forward end of the check valve body 111 is larger than an outer diameter of a remainder of the check valve body 111. Additionally, in the illustrated embodiment, an inner diameter of the leading end 102 of the shaft 101 (e.g., the inner diameter of the portion of the shaft 101 that is threaded with the internal threads 131) is larger an inner diameter of an intermediate portion of the shaft 101 aft of the leading end 102 of the shaft 101 such that a lip 151 is defined in the inner surface 121 of the shaft 101. The larger forward end of the check valve body 111 is configured to engage the lip 151 in the inner surface 121 of the shaft 101 to prevent the check valve body 111 from sliding within the shaft 101. Additionally, in the illustrated embodiment, the check valve body 111 defines an axial opening 115 and a bore 116. The axial opening 115 extends rearward from a front end of the check valve body 111 into the bore 116. The bore 116 extends rearward to a rear end of the check valve body 111. The bore 116 is larger than the axial opening 115 such that a step or shoulder 117 is defined between the axial opening 115 and the bore 116 in the check valve body 111. In the illustrated embodiment, the check valve 105 also includes a gasket (e.g., an O-ring) 118 supported on the shoulder 117 of the check valve body 111. Additionally, in the illustrated embodiment, an outer sidewall of the check valve body 111 defines an annular recess (e.g., an annular groove) 119 accommodating a gasket (e.g., an O-ring) 120. When the check valve 105 is received in the chamber 104 of the shaft 101, the gasket 120 engages the inner surface 121 of the shaft 101 and forms a fluid-tight seal.

In the illustrated embodiment, the rear cap 112 is of a generally cylindrical shape defining an axial opening 122 and a bore 123. The bore 123 extends rearward from a front end of the rear cap 112. The axial opening 122 extends rearward from the bore 123 to a rear end of the rear cap 112. The bore 123 is larger than the axial opening 122 such that a seat 124 is defined between the axial opening 122 and the bore 123 in the rear cap 112.

Additionally, in the illustrated embodiment, the valve poppet 113 includes a head 125 having a tapered surface 126 and a stem 127 extending rearward from the head 125. In the illustrated embodiment, the head 125 is larger than the stem 127 (e.g., the head 125 has a larger diameter than the stem 127) such that a lip 128 is defined between the head 125 and the stem 127 of the valve poppet 113. In the illustrated embodiment, the size (e.g., outer diameter) of the head 125 of the valve poppet 113 is slightly smaller than the size (e.g., inner diameter) of the bore 123 in the rear cap 112 such than an annular gap is defined between the head 125 of the valve poppet 113 and the rear cap 112.

In the illustrated embodiment, the spring 114 extends between the lip 128 on the valve poppet 113 and the seat 124 in the rear cap 112. A portion of the spring 114 extends around the stem 127 of the valve poppet 113. The spring 114 biases the head 125 of the valve poppet 113 into engagement with the gasket (e.g., the O-ring) 118 supported on the shoulder 117 of the check valve body 111 such that the shoulder 117 acts as a seat for the head 125 of the valve poppet 113. The engagement between the tapered surface 126 of the valve poppet 113 and the gasket 118 creates a fluid-tight seal such that gas cannot pass through the check valve 105 when the check valve 105 is in a closed configuration. When a gas (e.g., air) having sufficient pressure to overcome the biasing force of the spring 114 is pumped through the axial opening 115 of the check valve body 111, the valve poppet 113 slides rearward and compresses the spring 114, which creates a gap between the tapered surface 126 of the valve poppet 113 and the gasket 118. The gap between the tapered surface 126 of the valve poppet 113 and the gasket 118 places the axial opening 115 of the check valve body 111 in fluid communication with the annular gap defined between the head 125 of the valve poppet 113 and the rear cap 112 and in fluid communication with the bore 123 and the axial opening 122 in the rear cap 112 such that the gas may flow through the check valve 105 and into the pre-charge chamber 109 of the shaft 101. When the gas is no longer being pumped into the shaft 101 though the check valve 105, the compressed spring 114 is configured to return the valve poppet 113 to the closed position in which the tapered surface 126 of the valve poppet 113 engages the gasket 118 and creates a fluid-tight seal. Additionally, once the gas has been pumped into the pre-charge chamber 109 of the shaft 101, the pressure of the gas in the pre-charge chamber 109 and the biasing force of the spring 114 cooperate to maintain the check valve 105 in the closed position, which prevents the gas in the pre-charge chamber 109 from escaping through the check valve 105, the significance of which is described below.

In one or more embodiments, the check valve 105 may have any other suitable configuration and the check valve 105 may be any other suitable type or kind of in-line check valve.

With continued referenced to the embodiment illustrated in FIGS. 1A-1B, the spear 100 also includes a check valve retaining screw 129 configured to retain the check valve 105 in the chamber 104 of the shaft 101. When the check valve 105 and the check valve retaining screw 129 are received in the chamber 104 of the shaft 101, the check valve retaining screw 129 is positioned between the check valve 105 and the leading end 102 of the shaft 101. In the illustrated embodiment, the check valve retaining screw 129 includes external threads 130 configured to engage the internal threads 131 in the shaft 101. The check valve retaining screw 129 also includes a tool engagement recess (e.g., a hex key recess) 132 configured to be engaged by a tool for threading the check valve retaining screw 129 into the internal threads 131 in the leading end 102 of the shaft 101. The check valve retaining screw 129 also defines a central opening 133 configured to permit gas (e.g., air) to flow through the retaining screw 129 and into the pre-charge chamber 109 of the shaft 101 through the check valve 105, as described above.

In the illustrated embodiment, the spear head 106 includes a spear point 134 and a spear barb 135 connected to the spear point 134. The spear head 106 is detachable from the shaft 101. In the illustrated embodiment, a rear end of the spear head 106 includes external threads 136 configured to engage the internal threads 131 in the leading end 102 of the shaft 101. In one or more embodiments, the shaft 101 and/or the spear head 106 may include any other suitable mechanism for detachably coupling the spear head 106 to the hollow shaft 101. As described in more detail below, the spear head 106 may be detached from the shaft 101 to permit a gas pre-charge (e.g., air) to be pumped into the pre-charge chamber 109 of the shaft 101 through the check valve 105 to prepare the spear for firing and then reattached to the leading end 102 of the shaft 101 after the gas pre-charge has been pumped into the pre-charge chamber 109 of the shaft 101.

With continued reference to the embodiment illustrated in FIGS. 1A-1B, the spear piston 107 forms a fluid-tight seal with the inner surface 121 of the shaft 101. In the illustrated embodiment, the spear piston 107 includes a piston body 137 defining an annular recess (e.g., an annular groove) 138 and a gasket (e.g., an O-ring) 139 retained in the annular recess 138 of the piston body 137. In the illustrated embodiment, the piston body 137 is a cylindrical member having a front face 140, a rear face 141 opposite to the front face 140, and an outer sidewall 142 extending between the front and rear faces 140, 141. The gasket 139 is configured to engage the inner surface 121 of the shaft 101 to form the fluid-tight seal between the spear piston 107 and the shaft 101. The fluid-tight seal is configured to prevent or at least mitigate fluid leaking between the pre-charge chamber 109 and the firing charge chamber 110. In one or more embodiments, the piston body 137 of the spear piston 107 may be made out any suitable light-weight material, such as, for instance, plastic.

In the illustrated embodiment, the spear 100 also includes an end fitting 143 coupled to the trailing end 103 of the shaft 101. The end fitting 143 is configured to prevent the spear piston 107 from sliding out of the chamber 104 through the trailing end 103 of the shaft 101 (i.e., the end fitting 143 is configured to retain the spear piston 107 in the chamber 104 of the shaft 101). In the illustrated embodiment, the end fitting 143 is a generally cylindrical member including a body 144 and a stem 145 extending from the body 144. The end fitting 143 defines a central axial opening 146 configured to permit gas (e.g., a firing charge of compressed $CO_2$) to pass into and out of the firing chamber 110 through the trailing end 103 of the shaft 101, the significance of which is described below. In the illustrated embodiment, the stem 145 of the end fitting 143 extends into the firing chamber 110 of the shaft 101 and the body 144 of the end fitting 143 is outside of the firing chamber 110 when the end fitting 143 is connected to the shaft 101. Additionally, in the illustrated embodiment, at least a portion of the stem 145 of the end fitting 143 includes external threads 147 configured to engage internal threads 148 in the trailing end 103 of the shaft 101. In one or more embodiments, the end fitting 143 and/or the shaft 101 may include any other suitable mechanism or features for connecting the end fitting 143 to the shaft 101. Although in the illustrated embodiment the end fitting 143 is detachable from the shaft 101, in one or more embodiments, the end fitting 143 may be integral with the shaft 101. Additionally, in the illustrated embodiment, an outer surface of the body 144 of the end fitting 143 defines an annular recess 149 (e.g., an annular groove) accommodating a gasket (e.g., an O-ring) 150. The gasket 150 of the end fitting 143 is configured to engage a barrel of a spear gun when the spear is loaded into the spear gun. The engagement between the gasket 150 of the end fitting 143 and the barrel of the spear gun is configured to prevent a firing charge (e.g., compressed $CO_2$) from escaping through an annular gap between the barrel of the spear gun and the outer surface of the spear 100.

FIGS. 2A-4B depict a spear gun 200 according to one embodiment of the present disclosure. The embodiment of the spear gun 200 illustrated in FIGS. 2A-2B is configured to launch the embodiment of the spear 100 illustrated in FIGS. 1A-1B. FIG. 2A depicts the spear gun 200 in a cocked and loaded configuration and FIG. 2B depicts the spear gun 200 in a fired configuration. In the illustrated embodiment, the spear gun 200 includes trigger block 201, a housing 266 (e.g., an outer tube) coupled to the trigger block 201, a barrel 202 coupled to the housing 266, a firing mechanism 203 coupled to the trigger block 201 and the housing 266, a cocking mechanism 204 (see FIGS. 3A-3B) coupled to the housing 266, and a lock and release assembly 205 (see FIGS. 4A-4B) coupled to the cocking mechanism 204 for selectively locking and unlocking the cocking mechanism 204.

Figure 2B:
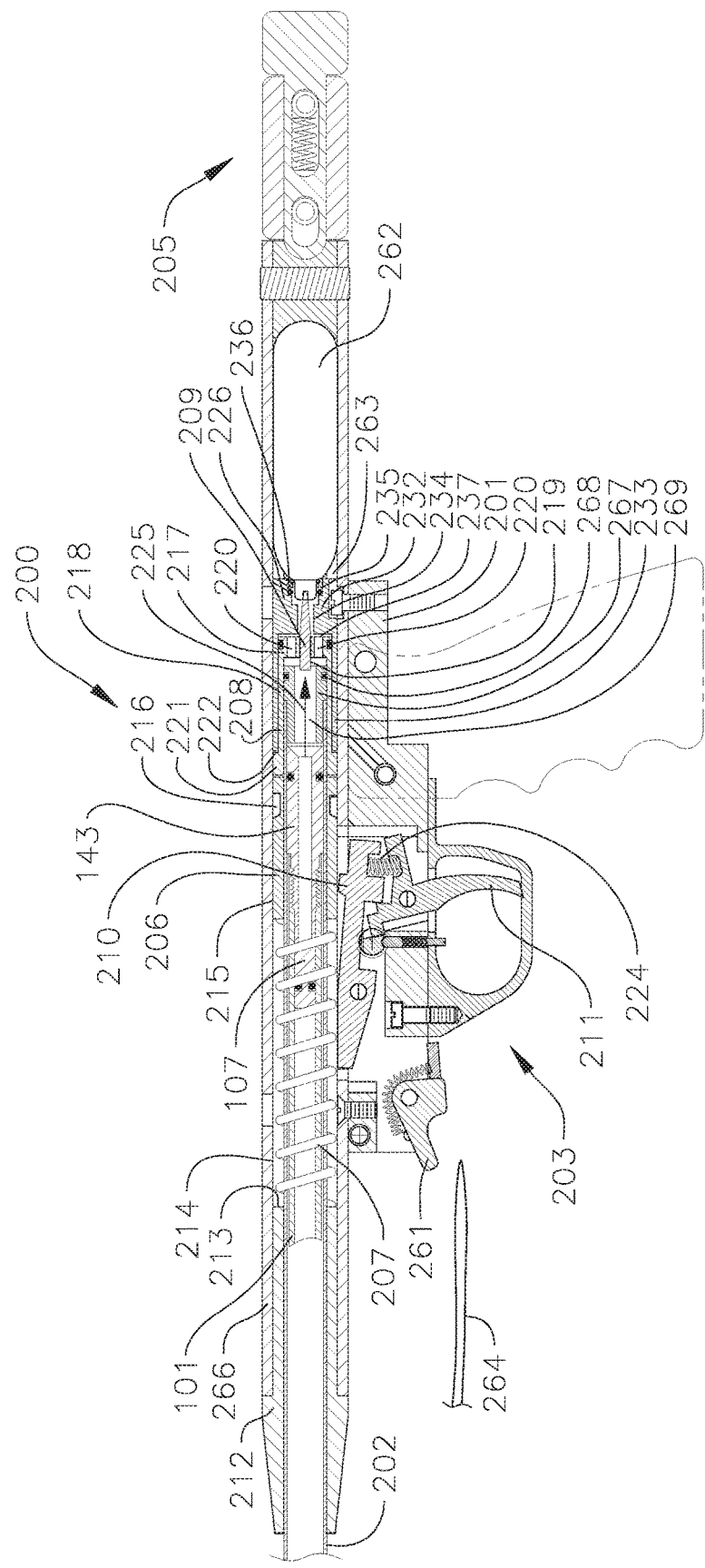

In the embodiment illustrated in FIGS. 2A-2B, the firing mechanism 203 includes a hammer 206, a firing spring 207 engaging the hammer 206, a firing piston 208, a firing pin 209 supported by the firing piston 208, a sear 210, and a trigger 211. The hammer 206, the firing spring 207, the firing piston 208, and the firing pin 209 are retained in the housing 266. In the illustrated embodiment, the spear gun 200 also includes a spring sleeve 212 coupled a front end of the housing 266. The spring sleeve 212 is smaller than the housing 266 such that an annular step or shoulder 213 is defined between the spring sleeve 212 and an inner surface 214 of the housing 266. The firing spring 207 extends between the hammer 206 and the annular shoulder 213 defined between the spring sleeve 212 and the inner surface 214 of the housing 266. In the illustrated embodiment, the hammer 206 is a generally cylindrical tube including a sidewall 215 and an annular notch 216 defined in an outer surface of the sidewall 215. In one or more embodiments, the barrel 202 is coupled (e.g., epoxied or press-fit) into the spring sleeve 212 and the assembly of the barrel 202 and the spring sleeve 212 is rigidly coupled to the housing 266.

In the illustrated embodiment, the spear gun 200 also includes an end cap 267 coupled to a rear end of the barrel 202 and a grommet 268 (e.g., an O-ring) retained in an annular recess in an outer surface of the end cap 267. The end cap 267 may be coupled to the barrel 202 in any suitable manner, such as, for instance, epoxied and/or press-fit into the rear end of the barrel 202. The end cap 267 defines a central axial opening 269. The grommet 268 is configured to form a seal with an inner surface of the piston 208.

With continued reference to the embodiment illustrated in FIGS. 2A-2B, the firing piston 208 is a generally cylindrical member including a base 217 at a rear end of the firing piston 208 and a sidewall 218 extending forward from the base 217. In the illustrated embodiment, the base 217 of the firing piston 208 is a cylindrical disc defining a central firing pin opening 219 configured to accommodate and support the firing pin 209 and a series of water passages 220 circumferentially arranged around the central firing pin opening 219. Additionally, in the illustrated embodiment, the firing piston 208 also includes an annular flange 221 on the forward end of the sidewall 218. In the illustrated embodiment, an outer diameter of the annular flange 221 is slightly smaller than the inner diameter of the housing 266 (e.g., a slip fit is defined between the annular flange 221 of the firing piston 208 and the inner surface 214 of the housing 266). Additionally, in the illustrated embodiment, the outer diameter of the annular flange 221 is larger than the outer diameter of the sidewall 218 such that a lip 222 is defined between the annular flange 221 and the sidewall 218 of the firing piston 208.

As described in more detail below, the firing piston 208 and the hammer 206 are configured to slide (arrow 223 in FIG. 2A) forward within the housing 266 and compress the firing spring 207 as the spear gun 200 is cocked. In one or more embodiments, a spring 224 extending between the trigger and the sear 210 causes the sear 210 to extend up into the annular notch 216 in the hammer 206 when the spear gun 200 is cocked. The engagement between the sear 210 and the annular notch 216 in the hammer 206 holds the hammer 206 in the cocked position against the biasing forced of the compressed firing spring 207. When the trigger 211 is pulled, the sear 210 disengages the hammer 206 and the hammer 206, under the biasing force of the firing spring 207, slides rearward (arrow 225 in FIG. 2B) within the housing 266 and strikes the annular flange 221 of the firing piston 208. The contact between the hammer 206 and the firing piston 208 causes the firing piston 208 and the firing pin 209, which is supported by the firing piston 208, to travel rearward and puncture the gas cartridge to release a firing charge (e.g., compressed $CO_2$) for firing the spear 100.

With reference now to the embodiment illustrated in FIGS. 2A-3B, the cocking mechanism 204 includes a cocking sleeve 226 retained inside the housing 266 of the spear gun 200 and a pair of opposing cocking arms or swing arms 227 engaging the cocking sleeve 226. In the illustrated embodiment, the cocking arms 227 are on opposite sides of the housing 266. The cocking sleeve 226 is located inside the housing 266 behind the firing piston 208 (i.e., the cocking sleeve 226 is located between the firing piston 208 and the gas cartridge). Each of the cocking arms 227 includes a first end (e.g., a front end) 228 coupled to the trigger block 201 and a second end (e.g., a rear end) 229 coupled to the lock and release assembly 205. The cocking arms 227 are configured to rotate (arrow 265) between an unloaded or loaded position (FIG. 3A) and a cocked position (FIG. 3B) about the first ends of the cocking arms 227 that are coupled to the trigger block 201. The position of the cocking mechanism 204 illustrated in FIG. 3A corresponds to either an unloaded position or a loaded position of the spear gun depending on whether or not a gas cartridge has been loaded into the housing 266 of the spear gun 200. Additionally, in the illustrated embodiment, the cocking mechanism 204 includes a pair of engagement pins (e.g., fasteners) 230 coupled to the pair of cocking arms 227. Only a single cocking arm 227 and a single engagement pin 230 are visible in FIGS. 3A-3B. In the illustrated embodiment, the engagement pins 230 are coupled to the cocking arms 227 proximate to the first ends 228 of the cocking arms 227. The engagement pins 230 extend through a pair of opposing elongated openings (e.g., slots) 231 in the housing 266 and engage the cocking sleeve 226 retained inside the housing 266 of the spear gun 200 (e.g., the engagement pins 230 couple the cocking arms 227 to the cocking sleeve 226 inside the housing 266 of the spear gun 200). In one or more embodiments, the engagement pins 230 may be screws configured to be threaded into internally threaded openings in the cocking sleeve 226. In one or more embodiments, the engagement pins 230 may engage the cocking sleeve 226 in any other suitable manner. As described in more detail below, when the cocking arms 227 are rotated, the engagement between the engagement pins 230 and the cocking sleeve 226 causes the cocking sleeve 226 to slide forward within the housing 266 and engage the firing piston 208. The engagement between the cocking sleeve 226 and the firing piston 208 causes the firing piston 208 to slide forward and engage the hammer 206, which causes the hammer 206 to slide forward within the housing 266 into the cocked position.

Additionally, in the embodiment illustrated in FIGS. 2A-2B, the cocking sleeve 226 is a generally cylindrical member including a cap 232 at a rear end of the cocking sleeve 226 and a sidewall 233 extending forward from the cap 232. The cocking sleeve 226 defines a firing pin opening 234 extending through the cap 232 that is configured to receive the firing pin 209 when the spear 100 is fired from the spear gun 200 (i.e., a portion of the firing pin 209 extends through the firing pin opening 234 in the cocking sleeve 226 when the spear 100 is fired from the spear gun 200). A rear end of the cap 232 defines a recess 235 that forms a seat for a gasket (e.g., an O-ring) 236. The gasket 236 forms a seal with a gas cartridge loaded in the housing 266 of the spear gun 200. In the illustrated embodiment, an outer diameter of the cocking sleeve 226 is slightly smaller than an inner diameter of the housing 266 (e.g., a slip fit is defined between the cocking sleeve 226 and the inner surface 214 of the housing 266). Additionally, in the illustrated embodiment, an outer diameter of the sidewall 218 of the firing piston 208 is slightly smaller than an inner diameter of the sidewall 233 of the cocking sleeve 226 such that the sidewall 218 and the base 217 of the firing piston 208 are configured to slide into a cavity 237 defined by the sidewall 233 of the cocking sleeve 226.

As described in more detail below, as the cocking arms 227 are rotated (arrow 265) into the cocked position (FIG. 3B), the engagement pins 230 slide forward within the elongated openings 231 in the housing 266 and thereby force the cocking sleeve 226 to slide forward within the housing 266 of the spear gun 200. As the cocking sleeve 226 slides forward within the housing 266, the cocking sleeve 226 engages the firing piston 208, which forces the firing piston 208 to slide forward (arrow 223) within the housing 266 and over the end cap 267 at the rear end of the barrel 202. Additionally, as the firing piston 208 slides forward, the firing piston 208 engages the hammer 206, which forces the hammer 208 to slide forward (arrow 223) within the housing 266 and along the barrel 202. The forward movement (arrow 223) of the hammer 208 compresses the firing spring 207. The cocking mechanism 204 is configured to slide the cocking sleeve 226, the firing piston 208, and the hammer 206 and compress the firing spring 207 until the annular notch 216 in the hammer 206 is engaged by the sear 210, which retains the hammer 206 in the cocked position until the trigger 211 is pulled.

Figure 3A:
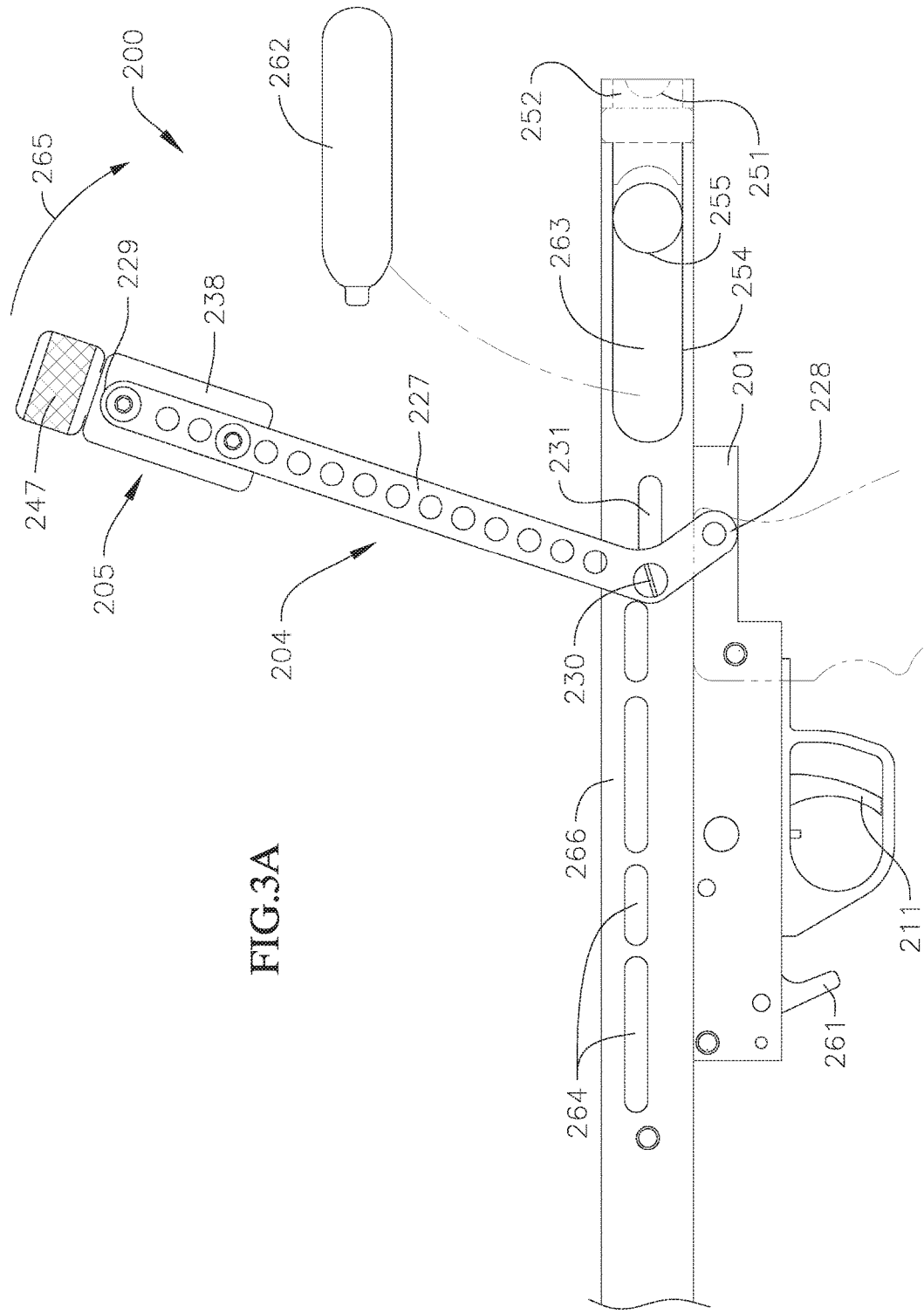

With reference now to FIGS. 4A-4B, the lock and release assembly 205 is configured to lock the cocking mechanism 204 in the unloaded or loaded position (FIG. 3A) and to selectively unlock the cocking mechanism 204 to permit the user to rotate (arrow 265) the cocking mechanism 204 into the cocked position (FIG. 3B). In the embodiment illustrated in FIG. 4A-4B, the lock and release assembly 205 includes a locking sleeve 238, a locking bar or plunger 239 received in the locking sleeve 238, a pair of pins 240, 241 coupling the locking bar 239 to the locking sleeve 238, and a spring 242. In the illustrated embodiment, the locking sleeve 238 is a cylindrical member defining a central axial opening 243 and a pair of transverse openings 244, 245. In the illustrated embodiment, the locking bar 239 includes an elongate stem 246 and a cap 247 coupled to an end of the stem 246. The elongate stem 246 of the locking bar 239 defines a pair of elongate openings (e.g., slots) 248, 249. The elongate stem 246 of the locking bar 239 is received in the central axial opening 243 in the locking sleeve 238 such that the elongate openings 248, 249 in the stem 246 are aligned with the transverse openings 244, 245 in the locking sleeve 238. The spring 242 is retained in one of the elongate openings 249 in the stem 246 of the locking bar 239 and extends between one end of the elongate opening 249 and the pin 241 extending through the elongate opening 249 in the stem 246 and the corresponding transverse opening 245 in the locking sleeve 238. The spring 242 is configured to impart a force biasing the stem 246 of the locking bar 239 to extend through the central axial opening 243 in the locking sleeve 238 and thereby bias the lock and release assembly 205 into the locked configuration.

The locking bar 239 is configured to slide (arrow 250) within the central axial opening 243 in the locking sleeve 238. When the lock and release assembly 205 is in the locked configuration, the stem 246 of the locking bar 239 extends through the central axial opening 243 in the locking sleeve 238 and into a recess (e.g., a hemispherical depression) 251 defined in a plug 252 coupled to a rear end of the housing 266. Although in the illustrated embodiment the plug 252 is coupled to the housing 266 by a retaining pin 253, in one or more embodiments, the plug 252 may be coupled to the housing 266 by any other suitable mechanism. The engagement between the stem 246 of the locking bar 239 and the recess 251 in the plug 252 is configured to retain the cocking mechanism 204 in the loaded or unloaded position (FIG. 3A). To move the lock and release assembly 205 into the unlocked position (FIG. 4B), the cap 247 of the locking bar 239 may be grasped and pulled (arrow 250) with sufficient force to overcome the biasing force of the spring 242 and withdraw the stem 246 of the locking bar 239 from the recess 251 in the plug 252. In the illustrated embodiment, an outer surface of the cap 247 is knurled to enable a user to easily grip the locking bar 239.

With reference now to the embodiment illustrated in FIGS. 3A-3B, the housing 266 defines a port 254 configured to permit a gas cartridge (e.g., a CO2 cartridge) to be loaded into the housing 266 and unloaded from the housing 266. In the illustrated embodiment, when the cocking mechanism 204 is in the loaded position (FIG. 3A), one of the cocking arms 227 extends across (e.g., covers) the port 254 to retain the gas cartridge in the housing 266. In the illustrated embodiment, the housing 266 also defines an ejection opening 255 opposite to the port 254. The ejection opening 255 is configured to facilitate unloading the gas cartridge from the housing 266.

Figure 5:
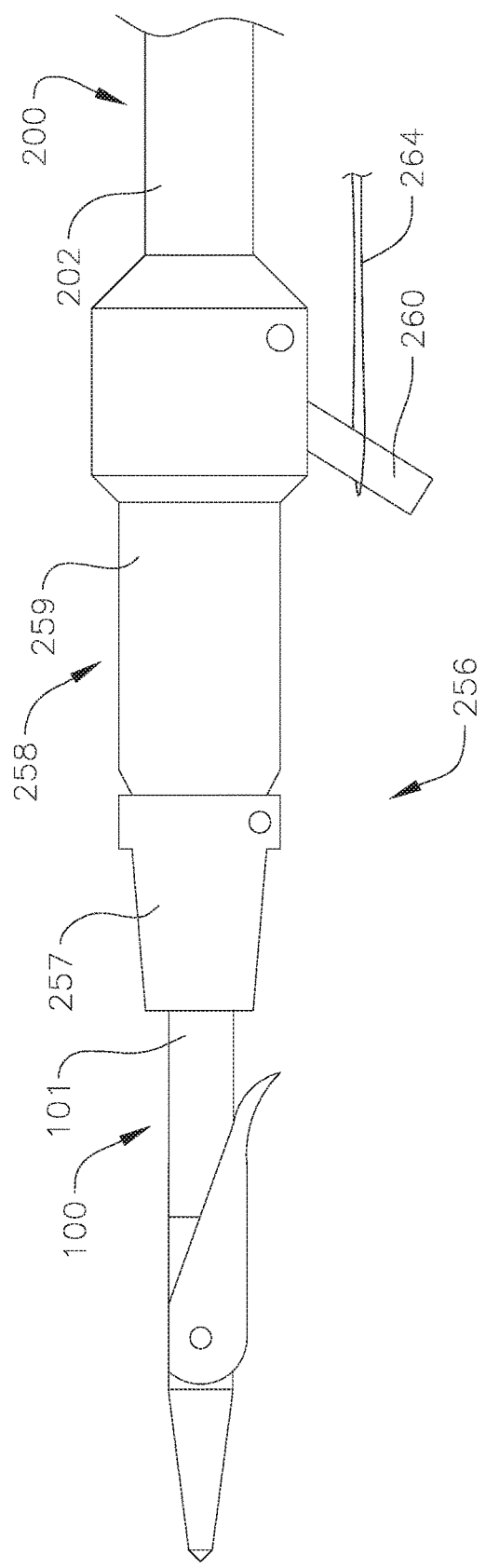
FIG. 5 is a side view of a spear retention mechanism according to one embodiment of the present disclosure.

With reference now to FIG. 5, the spear 100 and the spear gun 200 also include a spear retention mechanism 256 configured to connect the spear 100 to the spear gun 200 after the spear 100 has been fired from the spear gun 200, which facilitates retrieval of the spear 100. In the illustrated embodiment, the spear retention mechanism 256 includes a line slider 257 coupled to the shaft 101 of the spear 100 and a cap 258 coupled to the front end the barrel 202 of the spear gun 200. The cap 258 includes a body 259 and a projection (e.g., a pin) 260 extending outward from the body 259. The spear retention mechanism 256 also includes a line release 261 connected to the trigger block 201 of the spear gun 200. One end of a spear retention line 264 may be attached to the line slider 257 on the spear 100 and the other end of the spear retention line 264 may be attached to the cap 258 on the barrel 202 of the spear gun 200 to maintain the connection between the spear 100 and the spear gun 200 once the spear 100 has been fired from the spear gun 200 underwater. Additionally, the spear retention line 264 may be wound (e.g., coiled) around the pin 260 on the cap 258 and the line release 261 connected to the trigger block 201 of the spear gun 200. When the spear 100 is fired from the spear gun 200, the line slider 257 attached to the spear 100 pulls on the end of the spear retention line 264, which causes the line release 261 on the trigger block 201 of the spear gun 200 to rotate forward and release the wound segment of the spear retention line 264 extending between the projection 260 on the cap 258 and the line release 261 on the trigger block 201. Once the wound segment of the spear retention line 264 is released from the line release 261, the spear retention line 264 provides sufficient slack to permit the spear 100 to continue travelling through the water. Additionally, once the spear 100 is fired from the spear gun 200, the line slider 257 is configured to slide rearward along the spear shaft 101 until it is stopped by the end fitting 143 coupled to the trailing end 103 of the shaft 101.

Figure 6:
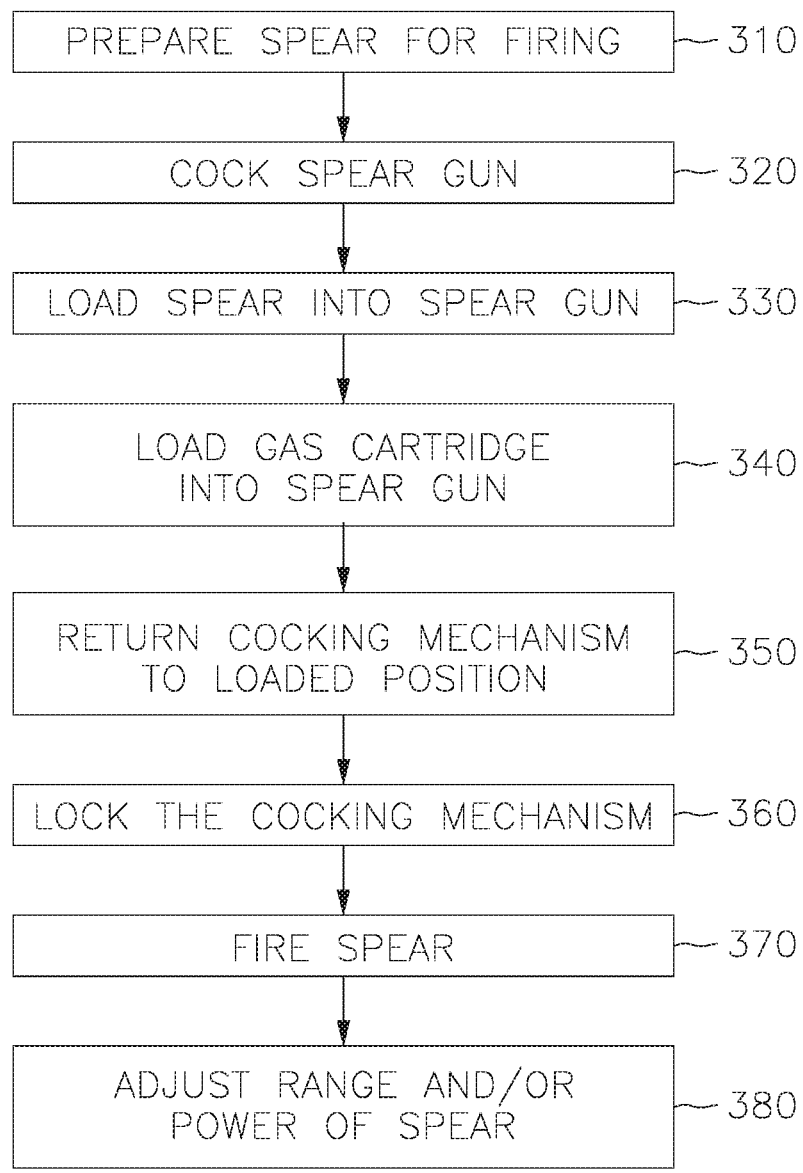
FIG. 6 is a flowchart illustrating a method of operating a spear and a spear gun according to one embodiment of the present disclosure.

FIG. 6 is a flowchart illustrating a method 300 of operating the spear 100 and the spear gun 200 according to one embodiment of the present disclosure. In the illustrated embodiment, the method 300 of operating the spear 100 and the spear gun 200 includes a task 310 of preparing the spear 100 for firing. The spear 100 may be prepared for firing by first detaching the spear head 106 from the leading end 102 of the shaft 101 (if attached) and then applying (e.g., pumping) a gas pre-charge (e.g., air) into the pre-charge chamber 109 of the shaft 101 through the check valve 105 (see FIG. 1B). The gas pre-charge may be applied into the pre-charge chamber 109 of the shaft 101 with any suitable device, such as, for instance, with a pistol grip air pump (e.g., a MITYVAC or similar air pump) or an external source of compressed air or other gas. As the gas pre-charge is applied into the pre-charge chamber 109, the pressure of the gas pre-charge forces the spear piston 107 to slide (arrow 108) within the chamber 104 toward the rear end of the shaft 101 (i.e., the size of the pre-charge chamber 109 expands as the gas pre-charge is applied into the pre-charge chamber 109 and the spear piston 107 slides rearward within the shaft 101). In one embodiment, the spear piston 107 may slide (arrow 108) within the chamber 104 until the spear piston 107 contacts the end fitting 143 coupled to the trailing end 103 of the shaft 101. Accordingly, in one or more embodiments, substantially the entire chamber 104 of the shaft 101 may be filled with the gas pre-charge. FIG. 1B illustrates the spear 100 in a configuration receiving the gas pre-charge (i.e., the spear head 106 is detached from the shaft 101, the check valve 105 is in the open position, and the spear piston 107 is in the rear position). Once the gas pre-charge has been pumped into the pre-charge chamber 109 with the desired pressure, the spear head 106 may be attached to the leading end 102 of the shaft 101 (e.g., by threading the external threads 136 of the spear head 106 into the internal threads 131 in the leading end 102 of the shaft 101). Additionally, as described in more detail below, since the gas pre-charge is retained in the pre-charge chamber 109, the spear 100 may be repeatedly fired from the spear gun 200 without having to refill or resupply the gas pre-charge (e.g., the task of applying the gas pre-charge into the pre-charge chamber 109 may be a one-time application). However, as described below, the pressure of the gas pre-charge in the pre-charge chamber 109 may be increased or decreased to adjust the range and/or power of the spear 100.

The method 300 of operating the spear 100 and the spear gun 200 also includes a task 320 of cocking the spear gun 200. In one or more embodiments, the task 320 of cocking the spear gun 200 includes moving the lock and release assembly 205 into the unlocked position to permit the cocking mechanism 204 to be rotated (arrow 265) into the cocked position (FIG. 3B). The lock and release assembly 205 may be moved into the unlocked position by grasping the cap 247 of the locking bar 239 and pulling rearward with sufficient force to overcome the biasing force of the spring 242 and withdraw the stem 246 of the locking bar 239 from the recess 251 in the plug 252 attached to the rear end of the housing 266.

Once the stem 246 of the locking bar 239 has been disengaged from the recess 251 in the plug 252, the spear gun 200 may be cocked by rotating (arrow 265) the cocking arms 227 and the lock and release assembly 205, which is attached to the rear end of the cocking arms 227, into the cocked position, as illustrated in FIG. 3B. As the cocking arms 227 are rotated (arrow 265) into the cocked position (FIG. 3B), the engagement pins 230 slide forward within the elongated openings 231 in the housing 266 and thereby force the cocking sleeve 226, which is engaged by the engagement pins 230, to slide forward within the housing 266 of the spear gun 200. As the cocking sleeve 226 slides forward, the forward end of the sidewall of the cocking sleeve 226 engages the lip on the firing piston 208 and forces the firing piston 208 to slide forward within the housing 266. Additionally, as the firing piston 208 slides forward within the housing 266, the firing piston 208 engages the hammer 206, which forces the hammer 206 to slide forward within the housing 266 and compress the firing spring 207. The cocking mechanism 204 is configured to force the hammer 206 to slide forward within the housing 266 until the annular notch 216 in the hammer 206 is engaged by the sear 210, which holds or retains the hammer 206 in the cocked position against the biasing force of the compressed firing spring 207.

The method 300 of operating the spear 100 and the spear gun 200 also includes a task 330 of loading the spear 100 into the spear gun 200 by sliding the trailing end 103 of the shaft 101 into the barrel 202 of the spear gun 200. When the spear 100 is loaded into the barrel 202 of the spear gun 200, the gasket 150 of the end fitting 143 on the spear 100 engages an inner surface of the barrel 202 to prevent a firing charge (e.g., compressed $CO_2$) from escaping through an annular gap between the barrel 202 of the spear gun 200 and the outer surface of the spear 100. Additionally, in one or more embodiments, the spear 100 is loaded into the spear gun 200 while the cocking arms 227 are still in the cocked position (FIG. 3B). In one or more embodiments, leaving the cocking arms 227 in the cocked position (FIG. 3B) allows water that is displaced by the spear 100 entering the barrel 202 to travel through the openings 220 in the firing piston 208 and then through the firing pin opening 234 in the cocking sleeve 226, where the water exits through the empty cartridge loading chamber 263.

The method also includes a task 340 of loading a gas cartridge (e.g., a $CO_2$ gas cartridge) 262 into a loading chamber 263 defined in a rear end of the housing 266 of the spear gun 200 after the spear gun 200 has been cocked. The loading chamber 263 and the plug 252 may be configured to accommodate any size gas cartridge 262. For instance, conventional gas cartridges 262 are provided in a variety of different lengths depending on the capacity of the cartridge, and the loading chamber 263 and the plug 252 may be configured to accommodate relatively longer gas cartridges 262 having a relatively higher-pressure gas charge or relatively shorter gas cartridges 262 having a relatively lower-pressure gas charge. Additionally, in one or more embodiments, the plug 252 may be replaced with a plug having a different configuration suitable for the size of the gas cartridge 262 selected. The plug 252 may be removed, for instance, by removing the retaining pin 253. As described above, when the cocking mechanism 204 is in the unloaded position (FIG. 3A), one of the cocking arms 227 extends across (e.g., covers) the port 254 in the housing 266. As the cocking mechanism 204 is rotated (arrow 265) into the cocked position (FIG. 3B), one of the cocking arms 227 uncovers the port 254 in the housing 266, which facilitates loading the gas cartridge 262 into the loading chamber 263 of the spear gun 200 through the port 254.

The method 300 of operating the spear 100 and the spear gun 200 also includes a task 350 of returning the cocking mechanism 204 into the loaded position (FIG. 3A) after the gas cartridge 263 has been loaded into the housing 266. The task 350 of returning the cocking mechanism 204 into the loaded position includes rotating (arrow 265) the cocking arms 227 and the lock and release assembly 205 attached to the rear end of the cocking arms 227 into the loaded position (FIG. 3A). As the cocking arms 227 are rotated downward (arrow 265) into the loaded position, the cocking sleeve 226, the firing piston 208, and the firing pin 209 all move rearward together until the firing pin 209 contacts a tip of the gas cartridge 262. The contact between the firing pin 209 and the gas cartridge 262 causes the firing piston 208 and the firing pin 209 to move forward and create a small gap (e.g., approximately 0.1 inch) between the firing piston 208 and the cap 232 at a rear end of the cocking sleeve 226. In one or more embodiments, the firing mechanism 203 and the cocking mechanism 204 are configured such that the firing pin 209 remains in contact with the gas cartridge 262 until the time of firing.

In one or more embodiments, the method 300 of operating the spear 100 and the spear gun 200 also includes a task 360 of moving the lock and release assembly 205 into the locked position to lock the cocking mechanism 204 in the loaded position (FIG. 3A). The lock and release assembly 205 may be moved into the locked position by grasping the cap 247 of the locking bar 239 and pulling rearward with sufficient force to overcome the biasing force of the spring 242, aligning the lock and release assembly 205 with the housing 266, and then releasing the cap 247 of the locking bar 239 such that the stem 246 of the locking bar 239 extends into the recess 251 in the plug 252 attached to the rear end of the housing 266. The engagement between stem 246 of the lock and release assembly 205 and the recess 251 in the plug 252 attached to the rear end of the housing 266 is configured to retain the cocking mechanism 204 in the loaded position (FIG. 3A).

Water entrapped within the cavity 237 during the loading process is readily displaceable to permit the firing process to proceed. As described in detail below, during the firing process, the firing piston 208 forces the water out of the cavity 237, through the end cap 267 and the spear end fitting 143 and into the spear shaft 101 against the spear piston 137. The water moves the spear piston 137 forward within the spear shaft 101 against the slight resistance presented by the pre-charge in the pre-charge chamber 109. The movement of the water into the spear shaft 101 eliminates any resistance against the firing piston 208 and the firing pin 219 moving rearward to puncture the gas cartridge 262, which would otherwise be caused by the entrapped water remaining in the cavity 237.

The method 300 also includes a task 370 of firing the spear 100 from the spear gun 200 into a body of water (e.g., the ocean). The task 370 of firing the spear 100 includes pulling the trigger 211 of the firing mechanism 203. When the trigger 211 is pulled, the sear 210 disengages the annular notch 216 in the hammer 206 and the hammer 206, under the biasing force of the compressed firing spring 207, slides rearward within the housing 266 and over the barrel 202 and strikes the firing piston 208. In one or more embodiments, the last portion (e.g., approximately 0.1 inch) of the hammer's 206 rearward movement is inertial as the firing spring 207 disengages the hammer 206. The contact between the hammer 206 and the firing piston 208 causes the firing piston 208 and the firing pin 209, which is supported by the firing piston 208, to travel rearward and enter the cavity 237 of the cocking sleeve 226. As the leading edge of the firing piston 208 enters the cavity 237 in the cocking sleeve 226, water retained in the cavity 237 is forced out through the water passages 220 in the firing piston 208 (i.e., water displaced by the rearward movement of the firing piston 208 flows out through the water passages 220 in the firing piston 208). This small amount of displaced water then continues to flow into the central axial opening 269 in the barrel end fitting 267 and then through the central opening 146 in the spear end fitting 143, where the water then causes a slight (e.g., approximately ¼ inch) forward displacement of the spear piston 107 within the shaft 101 of the spear 100. Additionally, as the firing piston 208 and the firing pin 209 continue to slide rearward within the cocking sleeve 226, the firing pin 219 punctures the gas cartridge 262.

When gas cartridge 262 is punctured by the firing pin 209, the high-pressure firing charge (e.g., $CO_2$) in the gas cartridge 262 forces the firing piston 208, the firing pin 209, and the hammer 206 to slide forward and then the high-pressure firing charge flows through the firing pin opening 234 in the cocking sleeve 226 that was previously occupied by the firing pin 209. The high-pressure firing charge then flows through the passages 220 in the firing piston 208. The high-pressure firing charge then flows through the central axial opening 269 in the end fitting 267 at the rear end of the barrel 202. The high-pressure firing charge then flows through the central opening 146 in the end fitting 143 at the rear end of the spear 100 and into the firing charge chamber 110 of the shaft 101 through the rear end of the spear 100. The high-pressure firing charge then pushes against the spear piston 107. The pressure of the firing charge released from the gas cartridge 262 exceeds the pressure of the gas pre-charge in the pre-charge chamber 109 that biases the spear piston 107 toward the trailing end 103 of the shaft 101. In one or more embodiments, the pressure of the firing charge released from the gas cartridge 262 may be from approximately 800 psig to approximately 1200 psig (e.g., approximately 1000 psig). The pressure of the firing charge entering the firing charge chamber 110 of the spear 100 will be lower than the pressure of the firing charge when it is initially released from the gas cartridge 262 due to losses in the system, but the pressure of the firing charge entering the firing charge chamber 110 will still exceed the pressure of the gas pre-charge in the pre-charge chamber 109. Accordingly, the high-pressure firing charge discharged from the gas cartridge 262 forces the spear 100 to slide forward within the barrel 202 and the spear piston 107 to slide forward (arrow 108) within the chamber 104 toward the leading end 102 of the shaft 101. Because the mass of the spear piston 107 is significantly smaller than the mass of the remainder of the spear 100 (e.g., the combined mass of the shaft 101 and the spear head 106), the velocity at which the spear piston 107 slides forward within the shaft 101 of the spear 100 exceeds the velocity at which the spear 100 slides forward within the barrel 202 of the spear gun 200. Because the check valve 105 is configured not to permit fluid to flow out through the leading end 102 of the shaft 101, the sliding of the spear piston 107 toward the leading end 102 of the shaft 101 compresses the gas pre-charge in the pre-charge chamber 109. In one or more embodiments, the spear piston 107 may move to within approximately ½ in from the check valve 105 when the spear piston 107 is in the forward-most position. The distance that the spear piston 107 is spaced apart from the check valve 105 when it is in the forward-most position may depend on a variety of factors, including, for example, the pressure differential between the pressure of the gas pre-charge in the pre-charge chamber 109 and the pressure of the firing charge in the gas cartridge 262, the weight of the spear piston 107, and the size (e.g., length and diameter) of the shaft 101. By determining the extent to which the spear piston 107 travels along the spear shaft 101, the pressure of the gas pre-charge determines the amount of the high-pressure firing charge that will enter the spear 100. In this manner, the pressure of the gas pre-charge affects the range and/or power of the spear 100. As described in more detail below, the range and/or power of the spear 100 may be maximized by minimizing the pressure of the gas pre-charge (e.g., the pressure of the gas pre-charge may be selected to be the minimum pressure required to force the spear piston 107 to slide (arrow 108) within the chamber 104 toward the trailing end 103 of the shaft 101). Additionally, the range and/or power of the spear 100 may be adjusted by adjusting the pressure of the gas pre-charge in the pre-charge chamber 109 of the spear 100 (e.g., the higher the pressure of the gas pre-charge, the less the spear piston 107 will travel toward the check valve 105 before the spear 100 exits the barrel 202). The range and/or power of the spear 100 may also be adjusted by selecting a gas cartridge 262 having a higher or lower pressure firing charge.

The high-pressure gas discharged from the gas cartridge 262 and entering the firing charge chamber 110 of the spear 100 also launches the spear 100 from the barrel 202 of the spear gun 200 once the spear piston 107 has reached its forward-most position within the chamber 104. As the spear 100 travels through the water, the high pressure firing charge contained within the firing charge chamber 110 of the shaft 101 escapes or discharges through the central opening 146 in the end fitting 143 at the trailing end 103 of the shaft 101. This high pressure gas trailing the spear 100 is configured to mitigate cavitation of the water behind the spear 100 and the resultant low pressure caused by cavitation. Additionally, the high-pressure gas in the firing charge chamber 110 of the spear 100 has the potential to continue to accelerate the spear 100 after the spear 100 has left the barrel 202 of the spear gun 200. In this manner, the range, power, and overall efficacy of the spear 100 are increased compared to conventional spears.

Although in one or more embodiments the spear gun 200 is configured to utilize a single-use gas cartridge 262, in one or more embodiments the spear gun 200 may be configured to fire the spear 100 two or more times from a single gas cartridge 262. Additionally, although in the illustrated embodiment the spear gun 200 includes a firing pin 209 for puncturing the gas cartridge 262, in one or more embodiments, the spear gun 200 may incorporate any other suitable type or kind of pneumatic firing mechanism (e.g., the spear gun 200 may include a regulator and/or valve to selectively deliver a firing charge from the gas cartridge 262 to the spear 100).

In one or more embodiments, the spear piston 107 is configured to reach its forward-most position before the spear 100 is launched from the barrel 202 of the spear gun 200, which is configured to maximize the range of the spear 100 for a given pressure differential between the gas pre-charge and the firing charge. When the spear piston 107 is in the forward-most position, the pressure of the gas pre-charge in the pre-charge chamber 109, which increases as the spear piston 107 slides forward and compresses the gas pre-charge, is in equilibrium with the pressure of the firing charge in the firing charge chamber 110. In one or more embodiments in which the spear piston 107 is configured to reach its forward-most position before the spear 100 is launched from the barrel 202 of the spear gun 200, substantially all of the chamber 104 of the spear 100 may be filled with the firing charge before the spear 100 is launched from the spear gun 200. A variety of factors permit the spear piston 107 to reach its forward-most position in the chamber 104 of the shaft 101 before the spear 100 is launched from the spear gun 200, including the compressibility of the gas pre-charge in the pre-charge chamber 109, the light weight of the spear piston 107, and the high pressure differential between the pressure of the pre-charge in the pre-charge chamber 109 and the pressure of the firing charge in the firing charge chamber 110 (e.g., the ratio of the pressure of the pre-charge to the pressure of the firing charge may be approximately 1/200).

Additionally, as the spear 100 is traveling through the water and the high-pressure firing charge is discharging through the trailing end 103 of the shaft 101, the spear piston 107 is sliding rearward within the chamber 104 toward the rear end of the shaft 101 under the force of the gas pre-charge in the pre-charge chamber 109. Once all of the high-pressure firing charge has discharged from the shaft 101, the spear piston 107 will be in its rearward-most position proximate to the trailing end 103 of the shaft 101 (e.g., contacting the end fitting 143). When the spear piston 107 is in its rearward-most position, the spear piston 107 prevents water (e.g., sea water) from flowing into the chamber 104 through the trailing end 103 of the shaft 101 because the spear piston 107 forms a fluid-tight seal with the inner surface of the shaft 101. Additionally, the pressure of the gas pre-charge in the pre-charge chamber 109 provides a sufficient force against the spear piston 107 such that the water (e.g., sea water) does not force the spear piston 107 to slide forward within the chamber 104 (i.e., the pressure of the pre-charge in the pre-charge chamber 109 biases the spear piston 107 into the rearward-most position and thereby prevents water from entering the chamber 104 of the spear 100). Accordingly, the spear 100 may be reloaded on the spear gun 200 and fired again without having to displace water within the chamber 104 of the spear 100 (i.e., the spear piston 107 maintains the chamber 104 of the shaft 101 free of water and thus ready for firing).

Otherwise, if water were permitted to flow into the chamber 104 of the spear 100, a portion of the energy of the high-pressure firing charge discharged from the gas cartridge 262 may have to be expended forcing the water out of the chamber 104 rather than propelling the spear 100 through the water, which would limit the range, power, and overall efficacy of the spear 100. Additionally, if water were permitted to flow into the chamber 104 of the spear 100, the water may have to be displaced with a high-pressure charge prior to firing the spear 100 (i.e., water in the chamber 104 may prevent the spear 100 from being effectively fired at the time of releasing the firing charge). If a high pressure firing charge were released into a hollow spear filled with water at the time of firing, the spear would launch from the spear gun before all of the water was purged from the shaft due to the near incompressibility of water. Accordingly, the hollow shaft would not fill with the high-pressure firing charge that prevents cavitation of the water behind the spear and therefore the range, power, and overall efficacy of the spear would be reduced. Additionally, if the spear were retained in place while the spear is pressurized with a high-pressure charge to purge the water in the spear before firing, the firing charge may leak over time and thus potentially provide an insufficient firing charge once the spear is fired. Pressurizing the spear before firing also prevents the user from unloading the spear from the spear gun without having to fire the spear.

Accordingly, the spear 100 according to one or more embodiments of the present disclosure is configured to be filled with a compressible gas pre-charge that is configured to prevent water from entering the chamber 104 of the spear 100, which enables the spear 100 to be fired at the time of releasing the firing charge. Additionally, because the spear 100 is prepared for firing by pumping the gas pre-charge into the pre-charge chamber 109 of the shaft 101 prior to loading the spear 100 onto the spear gun 200 and the firing charge is not released from the gas cartridge 262 until the trigger 211 is pulled at the time of firing, the gas cartridge 262 and/or the spear 100 may be safely unloaded from the spear gun 200 without having to fire the spear 100 (i.e., a user may unload the unused gas cartridge 262 and/or the spear 100 from the spear gun 200 without having to fire the spear 100).

In one embodiment, to maximize the range and power of the spear 100, the pressure of the gas pre-charge may be minimized (i.e., the pressure of the gas in the pre-charge chamber 109 that must be overcome by the firing charge in the firing charge chamber 110 may be minimized). For instance, in one embodiment, the pressure of the pre-charge may be selected to be the minimal pressure required to overcome the friction between the spear piston 107 and the shaft 101 and force the spear piston 107 to slide (arrow 108) within the chamber 104 toward the trailing end 103 of the shaft 101. In one or more embodiments, the minimal pressure of the gas pre-charge necessary to move the spear piston 107 into the rear position may less than approximately 5 psig, such as, for instance, from approximately 3 psig to approximately 5 psig. The minimal pressure required to move the spear piston 107 rearward within the chamber 104 may vary depending on a variety of factors, such as, for instance, the size and weight of the spear piston 107.

The method 300 of operating the spear 100 and the spear gun 200 may also include a task 380 of adjusting the range and power of the spear 100 by changing the pressure of the gas in the pre-charge chamber 109 of the shaft 101 of the spear 100. To reduce the range and power of the spear 100 (e.g., when the spear 100 and spear gun 200 are being using to catch smaller prey or in close proximity to rocks or other formations that might damage the spear 100 if the spear 100 was launched with the maximum power), the pressure of the gas pre-charge in the pre-charge chamber 109 may be increased. Progressively higher pre-charge pressures result in progressively less high-pressure firing charge that will be stored in the firing charge chamber 104 of the shaft 101 before the shaft 101 exits the barrel 202. This reduction in the storage of high-pressure firing charge in the firing charge chamber 104 of the shaft 101 both lessens the amount of high-pressure gas available to act as a propellant once the spear 100 is launched and reduces the time it takes to expel all of the high-pressure gas from the firing charge chamber 104 of the spear 100, which results in cavitation that slows and stops the forward progress of the spear 100 through the water. Additionally, increasing the pressure of the gas pre-charge decreases the amount of the high-pressure firing charge that enters the firing charge chamber 110 when the spear 100 is fired, which reduces the range and power of the spear 100. The pressure of the pre-charge in the pre-charge chamber 109 may be adjusted by first detaching (e.g., unscrewing) the spear head 106 from the leading end 102 of the shaft 101. The pressure of the pre-charge in the pre-charge chamber 109 may then be increased by pumping additional gas into the pre-charge chamber 109 through the check valve 105. For instance, in one or more embodiments, the pressure of the gas pre-charge may be increased to approximately 100 psig or more. To increase the range and power of the spear 100, the pressure of the pre-charge in the pre-charge chamber 109 may be reduced by releasing the gas pre-charge in the pre-charge chamber 109 and then pumping a gas with the desired pressure (e.g., a minimal pressure, such as 5 psig or less) into the pre-charge chamber 109 of the shaft 101 through the check valve 105. The pressure of the pre-charge in the pre-charge chamber 109 may be released by at least partially unscrewing the check valve retaining screw 129 from the shaft 101 (e.g., unscrewing the check valve retaining screw 129 a few turns). When the check valve retaining screw 129 is at least partially unscrewed from the shaft 101, the pressure of the pre-charge in the pre-charge chamber 109 forces the check valve 105 to slide forward within the shaft 101, which breaks the seal between the gasket 120 and the inner surface 121 of the shaft 101 once the gasket 120 passes the lip 151 in the inner surface 121 of the shaft 101. Once the seal is broken, the gas pre-charge escapes from the pre-charge chamber 109. In one or more embodiments, the pressure of the pre-charge in the pre-charge chamber 109 may be released by depressing the valve poppet 113 of the internal check valve 105. Additionally, the range and/or power of the spear 100 may be adjusted by selecting a gas cartridge having the desired firing charge. For instance, a 12 g gas cartridge (e.g., a gas cartridge having an outer diameter of approximately 0.75 inch and a length of approximately 3.25 inches) having a relatively higher firing charge may be selected to increase the range and/or power of the spear 100 or an 8 g gas cartridge (e.g., a gas cartridge having an outer diameter of approximately 0.69 inch and a length of approximately 2.625 inches) having a relatively lower firing charge may be selected to reduce the range and/or power of the spear 100.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Additionally, although relative terms such as "front," "rear," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

What is claimed is:

1. A spear for a spear gun, comprising:
   a hollow shaft having a leading end and a trailing end opposite the leading end;
   a spear head configured to be coupled to the leading end of the hollow shaft;
   a piston retained in the hollow shaft and configured to slide within the hollow shaft, the piston forming a seal with an inner surface of the hollow shaft and dividing the hollow shaft into a pre-charge chamber toward the leading end and a firing charge chamber toward the trailing end, wherein the piston is configured to slide toward the leading end of the hollow shaft during firing of the spear from the spear gun; and
   a check valve coupled to the hollow shaft proximate to the leading end, the check valve in fluid communication with the pre-charge chamber and configured to permit a pressurized gas pre-charge to enter the pre-charge chamber and restrict the gas pre-charge in the pre-charge chamber from exiting the pre-charge chamber.

2. The spear of claim 1 adapted to permit the gas pre-charge to be introduced into the pre-charge chamber through the check valve, the gas pre-charge sliding the piston within the hollow shaft toward the trailing end and resulting in the pre-charge chamber being pressurized to a pre-charge pressure.

3. The spear of claim 1 adapted to be propelled from the spear gun by introducing a pressurized gas firing charge at a pressure higher than the pre-charge pressure into the firing charge chamber through the trailing end of the hollow shaft, the introducing of the pressurized gas firing charge filling the firing charge chamber with the gas firing charge, expanding the firing charge chamber by sliding the piston within the hollow shaft toward the leading end of the hollow shaft, and compressing the gas pre-charge within the pre-charge chamber to a pressure higher than the pre-charge pressure.

4. The spear of claim 1, further comprising an end fitting coupled to the trailing end of the hollow shaft configured to retain the piston within the hollow shaft.

5. The spear of claim 1, wherein the hollow shaft comprises steel or carbon fiber and wherein the piston comprises plastic.

6. The spear of claim 1, wherein the piston comprises an O-ring engaging the inner surface of the hollow shaft to form the seal.

7. A spear gun system, comprising:
   a spear gun, comprising:
   a trigger block;
   a housing coupled to the trigger block, the housing configured to receive a gas cartridge;
   a barrel extending from the housing; and
   a firing mechanism coupled to the trigger block and the housing; and a spear configured to be inserted into the barrel of the spear gun, comprising:
- a hollow shaft having a leading end and a trailing end opposite the leading end;
- a piston retained in the hollow shaft and configured to slide within the hollow shaft, the piston forming a seal with an inner surface of the hollow shaft and dividing the hollow shaft into a pre-charge chamber toward the leading end and a firing charge chamber toward the trailing end, wherein the piston is configured to slide toward the leading end of the hollow shaft during firing of the spear from the spear gun;
- a check valve coupled to the hollow shaft proximate to the leading end, the check valve in fluid communication with the pre-charge chamber and configured to permit a pressurized gas pre-charge to enter the pre-charge chamber and restrict the gas pre-charge in the pre-charge chamber from exiting the pre-charge chamber; and
- a spear head configured to be coupled to the leading end of the hollow shaft.

8. The spear gun system of claim 7, wherein the spear is adapted to permit the gas pre-charge to be introduced into the pre-charge chamber through the check valve, the gas pre-charge sliding the piston within the hollow shaft toward the trailing end and resulting in the pre-charge chamber being pressurized to a pre-charge pressure.

9. The spear gun system of claim 7, wherein, when the spear is attached to the spear gun and the firing mechanism is actuated to fire the spear from the spear gun, a firing charge having a pressure higher than the pre-charge pressure is released from the gas cartridge into the firing charge chamber through the trailing end of the hollow shaft, the firing charge forcing the piston to slide within the chamber of the hollow shaft toward the leading end of the hollow shaft and compressing the gas pre-charge within the pre-charge chamber to a pressure higher than the pre-charge pressure.

10. The spear gun system of claim 9, wherein the pre-charge pressure of the gas pre-charge is from approximately 3 psig to approximately 100 psig and the pressure of the firing charge is initially from approximately 800 psig to approximately 1200 psig.

11. The spear gun system of claim 7, wherein the firing mechanism comprises a spring-loaded hammer and a pin, the spring-loaded hammer configured to drive the pin into the gas-cartridge to puncture the gas-cartridge when the firing mechanism is actuated.

12. The spear gun system of claim 11, wherein the firing mechanism further comprises a trigger and a sear, and wherein when the trigger is pulled, the sear disengages spring-loaded hammer.

13. The spear gun system of claim 7, further comprising a cocking mechanism for cocking the spear gun, the cocking mechanism comprising a cocking sleeve in the housing of the spear gun and at least one cocking arm engaging the cocking sleeve.

14. The spear gun system of claim 13, further comprising a lock and release mechanism coupled to the cocking mechanism for selectively locking and unlocking the cocking mechanism to the housing of the spear gun.

15. A method of firing a spear from a spear gun, the spear comprising a hollow shaft having a leading end and a trailing end opposite the leading end, a piston retained in the hollow shaft and configured to slide within the hollow shaft, the piston forming a seal with an inner surface of the hollow shaft and dividing the hollow shaft into a pre-charge chamber toward the leading end and a firing charge chamber toward the trailing end, a check valve coupled to the hollow shaft proximate to the leading end, the check valve in fluid communication with the pre-charge chamber and configured to permit a pressurized gas pre-charge to enter the pre-charge chamber and restrict the gas pre-charge in the pre-charge chamber from exiting the pre-charge chamber, and a spear head configured to be coupled to the leading end of the hollow shaft, the method comprising:
- pumping a gas pre-charge into the pre-charge chamber of the hollow shaft through the check valve, the gas pre-charge forcing the piston to slide toward the trailing end of the hollow shaft;
- attaching the spear head to the leading end of the hollow shaft;
- loading the spear into a barrel of the spear gun; and
- firing the spear from the spear gun, the firing releasing a firing charge into the firing charge chamber through the trailing end of the hollow shaft, the firing charge forcing the piston to slide within the hollow shaft toward the leading end of the hollow shaft and compressing the gas pre-charge in the pre-charge chamber.

16. The method of claim 15, further comprising cocking the spear gun and loading a gas cartridge into the spear gun.

17. The method of claim 15, wherein the firing the spear comprises actuating a firing mechanism to release the firing charge from the gas cartridge, and wherein the firing charge has a greater pressure than the gas pre-charge.

18. The method of claim 17, wherein the pressure of the gas pre-charge is from approximately 3 psig to approximately 100 psig and the pressure of the firing charge is from approximately 800 psig to approximately 1200 psig.

19. The method of claim 15, wherein the pre-charge is a first pre-charge having a first pressure, and wherein the method further comprises adjusting a range of the spear by replacing the first pre-charge with a second pre-charge having a second pressure different than the first pressure of the first pre-charge.

* * * * *